Jan. 26, 1965  R. L. CAUFMAN  3,167,302
AERIAL PICK-UP SYSTEM
Filed Jan. 28, 1963  2 Sheets-Sheet 1

INVENTOR
Robert L. Caufman
BY Herbert M Birch
ATTORNEY

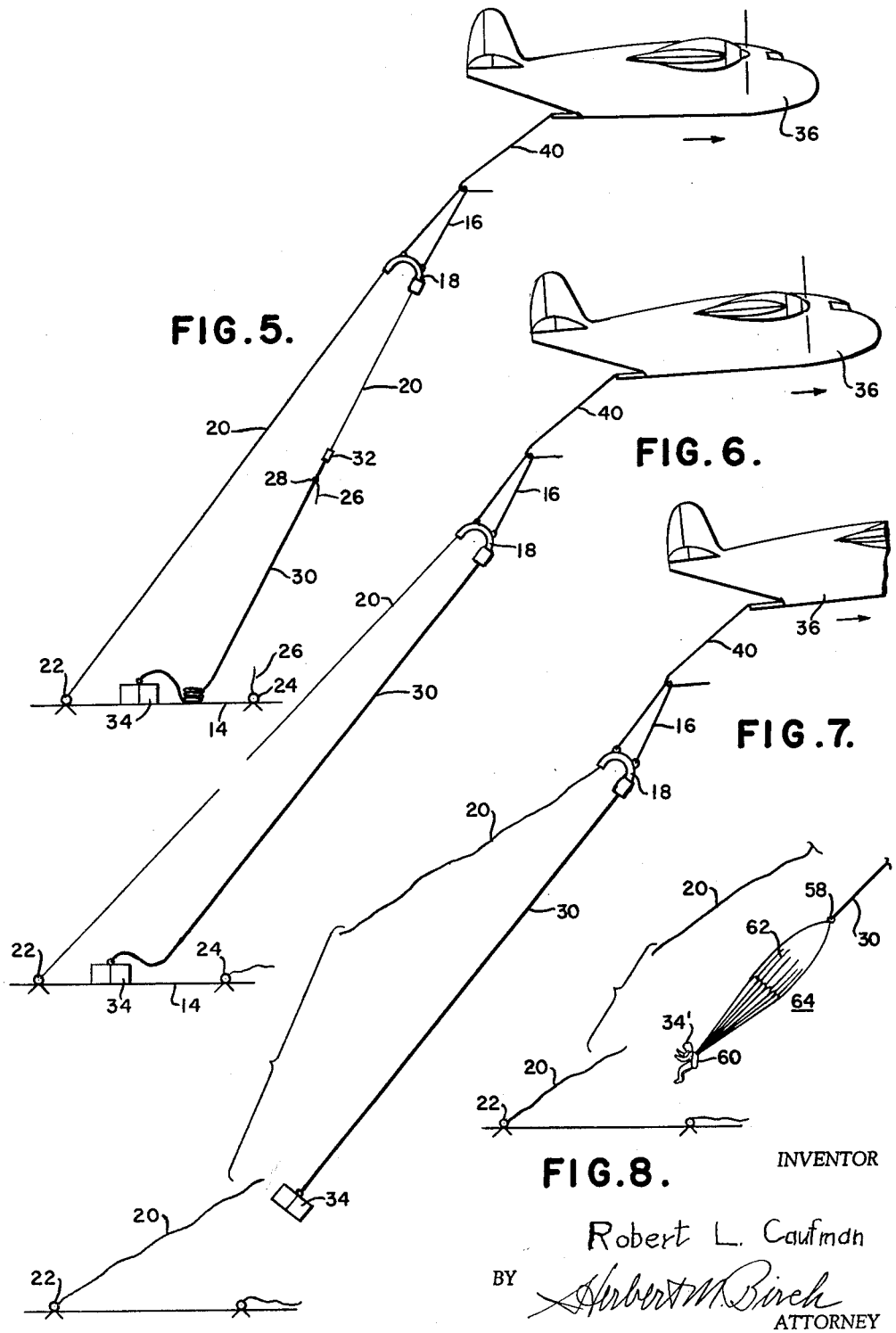

United States Patent Office 3,167,302
Patented Jan. 26, 1965

3,167,302
AERIAL PICK-UP SYSTEM
Robert L. Caufman, Wilmington, Del., assignor to All American Engineering Company, Wilmington, Del., a corporation of Delaware
Filed Jan. 28, 1963, Ser. No. 254,251
12 Claims. (Cl. 258—1.2)

This invention relates to aerial pick-up systems and more particularly to pick-up systems wherein an aircraft can pick up cargo or the like from a surface station while the said aircraft is maintaining altitude and airspeed.

It is an object of this invention to provide an aerial pick-up system having light-weight ground equipment which can be easily handled by a single operator.

Another object of this invention is to provide an aerial pick-up system wherein the kinetic energy of the aircraft is used to provide the energy required to effectuate the pick-up.

Another object of this invention is to provide an aerial pick-up system wherein an auxiliary pick-up line suspended from an airborne target means is utilized to accelerate a main pick-up line, attached at one end to the cargo, to the aircraft and the main pick-up line is subsequently used to deliver the cargo into the aircraft.

Yet another object of this invention is to provide an aerial pick-up system for human cargo wherein optimum safety conditions are provided.

Yet another object of this invention is to provide an aerial pick-up system wherein the equipment used is simple, light in weight and inexpensive.

These and other objects of this invention will become more fully apparent with reference to the following specification and drawings which relate to several preferred embodiments of the invention:

In the drawings:

FIGURE 5 is a schematic of a stage of the pick-up cycle subsequent in time to that of FIGURE 1;

FIGURE 6 is a schematic of a stage of the pick-up cycle subsequent in time to that of FIGURE 5;

FIGURE 7 is a schematic of a stage of the pick-up cycle subsequent in time to that of FIGURE 6; and FIGURE 8 is an operationnal schematic of a stage in the pick-up cycle of the embodiment of FIGURE 4.

Figure 1:
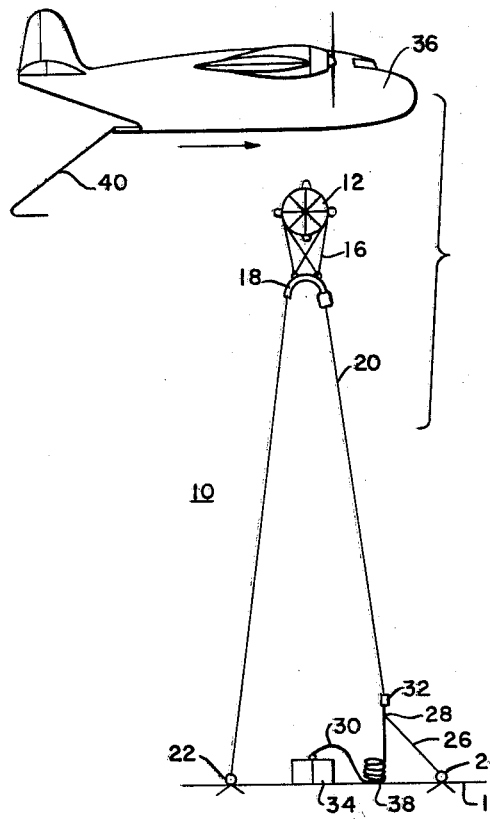
FIGURE 1 is a schematic of the assembled surface station equipment of the invention and the position of the aircraft immediately prior to the initiation of a pick-up cycle.

Referring in detail to the drawings, and more particularly to FIGURE 1, the ground station 10 is shown as including an airborne balloon target 12 tethered to the ground 14 via on integral bridle loop 16, a line guide means 18 and a pilot line 20 which is reeved through the line guide means and secured to the ground 14 by first and second land anchors 22 and 24, respectively.

The first land anchor 22 may be any suitable solid object or a strong anchor capable of restraining heavy loads, for a purpose to be hereinafter more fully described, and is directly connected to one end of the pilot line 20.

The second land anchor 24 is of smaller capacity than the first, for a purpose to be hereinafter more fully described, and is connected to the other end of the pilot line 20 via a weak link or line 26, coupling ring 28 on the main pick-up line 30 and a spring coupling means 32 connecting the main pick-up line 30 with the said other end of the pilot line 20.

The main pick-up line 30 is of much greater strength than the pilot line 20 and is connected at its other end to the cargo 34 which is to be picked-up by an aircraft such as the aircraft 36 shown. The bulk of the main pick-up line 30 is maintained as a coil or package 38 resting on the ground 14 at the initiation of the pick-up cycle.

The aircraft 36 is provided with dependent pick-up means 40 which is adapted to engage the bridle loop 16 of the airborne target balloon 12 as will be hereinafter more fully described.

Figure 2:
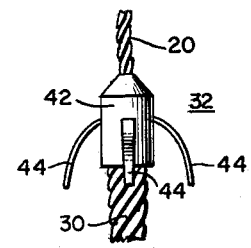
FIGURE 2 is an enlarged detail of a spring coupling generally shown in FIGURE 1.

Referring now to FIGURE 2, the spring coupling 32 is shown as comprising a splicing sleeve 42, joining the pilot line 20 and the main pick-up line 30, and a plurality of peripherally spaced integral spring fingers 44 which protrude radially outward and downward from the periphery of the coupling sleeve 42.

Figure 3:
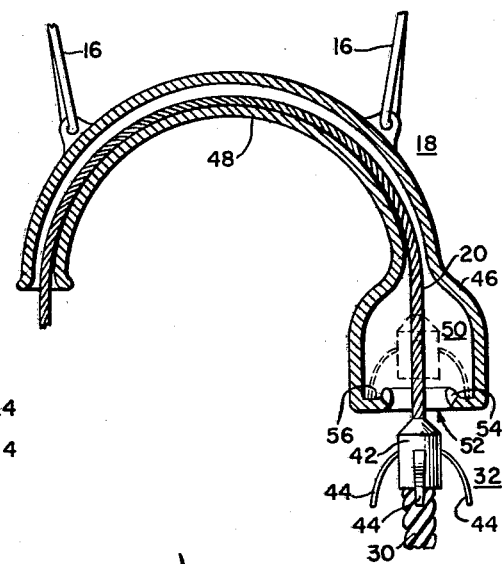
FIGURE 3 is an enlarged operational detail of the spring coupling and a coupling means with which it cooperates, both of which are generally shown in FIGURE 1.

Referring now to FIGURE 3, the line guide means 18 is shown as comprising a U-shaped tube having an enlarged diameter intake portion 46 and a reduced diameter exit portion 48.

The intake portion 46 comprises a coupling sleeve having an enlarged axially disposed coupling cavity or socket 50 therein. The mouth 52 of the socket 50 is upset to form an annular inwardly extending flange 54 which forms an annular inwardly opening channel 56 within the coupling socket 50.

In the position shown, the pilot line 20 is axially threaded through the entire line guide means 18 and the spring coupling 32 and main pick-up line 30 are immediately adjacent the mouth 52 of the coupling socket 50.

Figure 4:
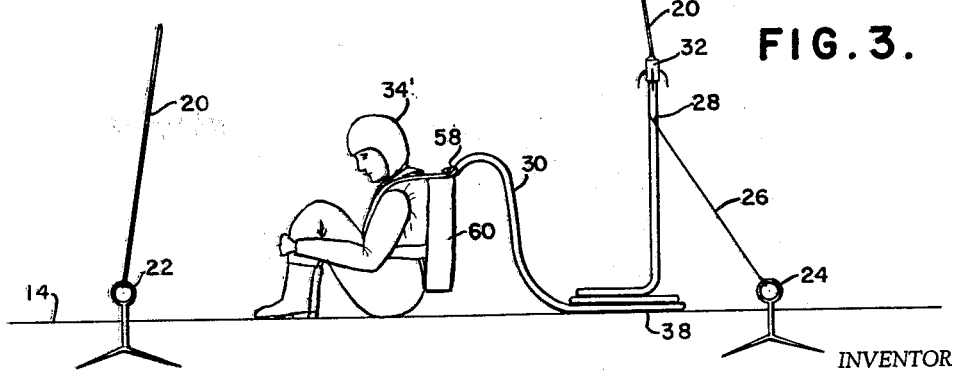
FIGURE 4 is a detailed showing of another embodiment of the invention.

If a human cargo is to be picked-up by the aircraft 36, the embodiment of FIGURE 4 is utilized wherein the human 34' connects the main pick-up line 30 to a coupling means 58 on a conventional parachute pack 60 which he has donned. Referring additionally to FIGURE 8, the coupling means 58 is connected with the apex of the canopy 62 of the parachute 64, whereby the human cargo 34' is ultimately connected with the dependent pick-up means 40 on the aircraft 36.

Operation

Referring to FIGURES 1, 3, 5, 6 and 7 the operation of one embodiment of the present invention will now be described.

Assuming that the first and second land anchors 22 and 24 have been set, the pilot line 20 reeved through the line guide 18 and secured to the said land anchors, the airborne target balloon 12 inflated and in raised position and the cargo 34 secured to the main pick-up line 30, the pick-up cycle is initiated by flying the aircraft 36 into close enough proximity with the balloon 12 to cause the dependent pick-up means 40 thereon to burst the said balloon and engage the bridle loop 16.

The kinetic energy of the aircraft 36 causes the bridle 16 to accelerate the line guide 18 and transmit a force through the pilot line 20 to break the weak link 26. Then, the pilot line will commence to pass through the line guide means 18 and accelerate the spring coupling means 32, with the main pick-up line 30 in tow, towards the line guide means 18 as specifically shown in FIGURE 5. The spring coupling 32 subsequently enters the mouth 52 of the coupling socket 50 in the line guide means 18 and because of the reduced diameter portion 48 is prevented from travelling any farther. Thus, the pilot line 20 is suddenly tensioned by the full kinetic energy of the aircraft 36 against the first land anchor 22.

The high load rating of the first land anchor 22 and the relatively low strength of pilot line 20 results in a failure of the pilot line as shown in FIGURE 6.

As shown in the dotted line position in FIGURE 3, and also in FIGURE 6, the spring fingers 44 on the spring coupling 32 are caused to seat in the annular channel 56 of the coupling cavity 50 by the drag imposed on the said spring coupling by the main pick-up line 30 and therefore, the main pick-up line 30 is now in tow behind the aircraft 36.

As soon as the slack in the main pick-up line 30 has been taken up, the cargo 34 is accelerated from the ground 14 towards the aircraft 36 as shown in FIGURE 7 and is shortly trailing the aircraft at substantially the same altitude and airspeed.

As for the embodiment of FIGURES 4 and 8, the same sequence occurs except that the parachute 64 is pulled from the parachute pack 60 via the pick-up line 30 and coupling ring 58 and the human cargo 34' is accelerated toward the aircraft 36.

As can be seen from the foregoing specification and drawings, this invention provides a new and novel aerial pick-up system which is light in weight and foolproof in operation and which satisfies a long felt need in the aerial pick-up art for a system which permits the flying of an aircraft at normal altitudes and speeds during the pick-up cycle.

It is to be understood that the embodiments of this invention shown and described herein are for the sake of example only and are not intended to limit the scope of the appended claims.

What is claimed is:

1. In an aerial pick-up system including an aircraft, pick-up means on said aircraft, a surface station, an airborne target means tethered to said surface station, a cargo at said surface station to be picked up by said aircraft, a pick-up line connected to said cargo and a pilot line interconnecting said pick-up line and said airborne target means and being tethered to said surface station to constrain said target means thereabove, the method of picking up said cargo with said aircraft comprising the steps of interconnecting said pilot line with said pick-up means, accelerating said pick-up line toward said aircraft with said pilot line by the kinetic energy of said aircraft, securing said pick-up line to said pick-up means, rupturing said pilot line and subsequently accelerating said cargo toward said aircraft by said pick-up line.

2. An aerial pick-up system comprising an aircraft, first pick-up means on said aircraft for picking up cargo at a surface station to be delivered to said aircraft via said first pick-up means while said aircraft is maintaining normal altitude and airspeed and second pick-up means at said surface station including a pick-up line connected at one end to said cargo, a pilot line connected at one end to the other end of said pick-up line, and an airborne target means connected with said pilot line, said pilot line being tethered to said surface station and being engageable with said first pick-up means to accelerate said pick-up line toward said aircraft without imparting acceleration to said cargo.

3. The invention defined in claim 2, wherein said pilot line is of substantially lesser strength and weight than said pick-up line and wherein both said pilot line and said pick-up line are composed of resilient synthetic fibers.

4. An aerial pick-up system comprising an aircraft, first pick-up means on said aircraft for picking up cargo at a surface station to be delivered to said aircraft via said first pick-up means while said aircraft is maintaining normal altitude and airspeed and second pick-up means at said surface station including a pick-up line connected at one end to said cargo, a pilot line connected at one end to the other end of said pick-up line, and tethered by the other end thereof to said surface station, an airborne target means, a pick-up loop on said target means, and a line guide means on said pick-up loop, said pilot line being reeved on said line guide means intermediate the ends thereof, whereby engagement of said pick-up loop by said first pick-up means on said aircraft will cause said pilot line and said line guide means to accelerate said pick-up line toward said guide means.

5. The invention defined in claim 4, wherein said pilot line is of substantially lesser strength and weight than said pick-up line and wherein both said pilot line and said pick-up line are composed of resilient synthetic fibers.

6. The invention defined in claim 4, wherein said second pick-up means further includes first coupling means interconnecting said pilot line and said pick-up line and second coupling means on said line guide means adapted to interlock with said first coupling means when said pilot line has accelerated said other end of said pick-up line into juxtaposition with said guide means.

7. The invention defined in claim 6, wherein said guide means comprises a U-shaped tube having a reduced diameter exit portion and an enlarged diameter intake portion and further wherein said first coupling means is integral with said intake portion.

8. In an aerial pick-up system including an aircraft, pick-up means on said aircraft, for picking up cargo at a surface station to be picked up by said aircraft, the combination at said surface station of an airborne target means, a pilot line tethering said target means to said surface station and a pick-up line interconnecting said pilot line and said cargo, said pilot line cooperating with said pick-up means to accelerate said pick-up line toward said aircraft without imparting acceleration to said cargo.

9. The invention defined in claim 8, wherein said pilot line is of substantially lesser strength and weight than said pick-up line and wherein both said pilot line and said pick-up line are composed of resilient synthetic fibers.

10. In an aerial pick-up system including an aircraft, pick-up means on said aircraft, for picking up cargo at a surface station to be picked up by said aircraft, the combination at said surface station of a pick-up line connected at one to said cargo and airborne pilot means tethered to said surface station and interconnected with the other end of said pick-up line, said pilot means cooperating with said pick-up means to accelerate said pick-up line toward said aircraft without imparting acceleration to said cargo.

11. In an aerial pick-up system including an aircraft, pick-up means on said aircraft for picking up a cargo at a surface station, an airborne target means tethered to a surface station, a pick-up loop on said target means, a line guide means suspended from said target means on said pick-up loop, a pilot line reeved on said line guide means tethered at one end to said surface station, and a pick-up line interconnecting the other end of said pilot line with said cargo, the method of picking up said cargo with said aircraft comprising, engaging said pick-up loop and rupturing said airborne target with said pick-up means on said aircraft, accelerating said other end of said pilot line and said pick-up line toward said aircraft by means of the kinetic energy derived from said aircraft by said line guide means acting against the tethered end of said pilot line, securing said pick-up line to said line guide means, rupturing said pilot line, and subsequently accelerating said cargo toward said aircraft by said pick-up line.

12. Means for accelerating an initially fixed body to a moving body utilizing the kinetic energy of said moving body comprising tow means connected with said fixed body of sufficient strength and weight to withstand acceleration loads on said fixed body, pilot means connected with said tow means and extending substantially into the path of said moving body and being only of sufficient strength and weight to withstand acceleration loads on said tow means exclusive of said fixed body and means on said moving body adapted to be interconnected with said pilot means.

References Cited by the Examiner

UNITED STATES PATENTS

| | | | |
|---|---|---|---|
| 1,812,955 | 7/31 | Horni | 258—1.2 |
| 2,334,979 | 11/43 | Adams | 258—1.6 |
| 2,467,112 | 4/49 | Cowgill | 258—1.6 |
| 2,505,707 | 4/50 | Du Pont | 258—1.2 |

LOUIS J. DEMBO, *Primary Examiner.*

RAPHAEL M. LUPO, *Examiner.*